United States Patent
Song et al.

(10) Patent No.: US 11,652,280 B2
(45) Date of Patent: May 16, 2023

(54) CELLULAR ANTENNA STRUCTURE FOR INTEGRATION WITHIN A VEHICLE

(71) Applicant: GM Global Technology Operations LLC, Detroit, MI (US)

(72) Inventors: Hyok Jae Song, Oak Park, CA (US); Hanseung Lee, Thousand Oaks, CA (US); Nahel Eshaq, Rochester, MI (US); Gregg R. Kittinger, Oakland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 17/200,187

(22) Filed: Mar. 12, 2021

(65) Prior Publication Data
US 2022/0294101 A1 Sep. 15, 2022

(51) Int. Cl.
*H01Q 1/32* (2006.01)
*H01Q 1/44* (2006.01)
*H01Q 9/04* (2006.01)

(52) U.S. Cl.
CPC ............ *H01Q 1/3275* (2013.01); *H01Q 1/44* (2013.01); *H01Q 9/0407* (2013.01)

(58) Field of Classification Search
CPC . A47B 46/00; A47B 47/0083; A47B 96/1416; A61M 31/002; A61M 31/007; C07D 207/48; C07D 211/96; C07D 277/06; C07D 401/12; C07D 403/12; C07D 409/12; C07D 413/12; C07D 417/12; C07D 471/04; H05K 7/1488; Y10T 29/49826; H01Q 1/3275; H01Q 1/44; H01Q 9/0407; H01Q 9/40; Y02T 10/82
See application file for complete search history.

(56) References Cited

U.S. PATENT DOCUMENTS

| | | | |
|---|---|---|---|
| 6,351,242 B1* | 2/2002 | Hesker | H01Q 21/28 343/873 |
| 8,622,458 B2* | 1/2014 | Hache | B60J 5/101 296/146.8 |
| 11,101,568 B1* | 8/2021 | Wakui | H01Q 9/42 |
| 2002/0140612 A1* | 10/2002 | Kadambi | H01Q 25/005 343/702 |
| 2003/0011213 A1* | 1/2003 | Zinsmeister | B62D 29/043 296/210 |
| 2004/0036656 A1* | 2/2004 | Nevermann | H04B 1/3833 343/702 |

(Continued)

OTHER PUBLICATIONS

Kwon et al., "A Fully Integrated Shark-Fin Antenna for MIMO-LTE, GPS, WLAN, and WAVE Applications", IEEE Antennas and Wireless Propagation Letters, vol. 17, No. 4, Apr. 2018, pp. 600-603.

(Continued)

*Primary Examiner* — Thien M Le
(74) *Attorney, Agent, or Firm* — Cantor Colburn LLP

(57) ABSTRACT

A cellular antenna structure for integration in a vehicle includes a ground plane to follow a slope of a spoiler chassis. The spoiler chassis is a portion of the vehicle covered by a spoiler. The cellular antenna structure also includes a cellular antenna orthogonal to the ground plane and electrically connected to the ground plane and a structural support affixed to the ground plane to maintain a fixed position of the cellular antenna orthogonal to the ground plane.

18 Claims, 3 Drawing Sheets

(56) References Cited

U.S. PATENT DOCUMENTS

2005/0184914 A1* 8/2005 Ollikainen ............... H04B 7/10
343/702
2006/0082515 A1* 4/2006 Petropoulos ........... H01Q 1/241
343/797
2019/0154439 A1* 5/2019 Binder .................... G01B 11/26

OTHER PUBLICATIONS

Low et al., "Hidden Automotive Antenna Performance and Simulation", IEEE Transactions on Antennas and Propagation, vol. 54, No. 12, Dec. 2006, pp. 3707-3712.

* cited by examiner

CELLULAR ANTENNA STRUCTURE FOR INTEGRATION WITHIN A VEHICLE

INTRODUCTION

The subject disclosure relates to a cellular antenna structure for integration within a vehicle.

Vehicles may include one or more cellular antennas for communication with one or more cellular networks. A vehicle occupant may couple a personal cellular device (e.g., smartphone, tablet) with a vehicle communication system (e.g., via Bluetooth connectivity). A cellular antenna of the vehicle may then implement communication via a cellular base station. Accordingly, it is desirable to provide a cellular antenna structure for integration within a vehicle.

SUMMARY

In one exemplary embodiment, a cellular antenna structure in a vehicle includes a ground plane to follow a slope of a spoiler chassis. The spoiler chassis is a portion of the vehicle covered by a spoiler. The cellular antenna structure also includes a cellular antenna orthogonal to the ground plane and electrically connected to the ground plane and a structural support affixed to the ground plane to maintain a fixed position of the cellular antenna orthogonal to the ground plane.

In addition to one or more of the features described herein, the cellular antenna is shaped to fit completely within a volume defined by the spoiler.

In addition to one or more of the features described herein, the cellular antenna is shaped as a plate with one or more bends.

In addition to one or more of the features described herein, every dimension of the cellular antenna is less than a wavelength corresponding with a lowest operating frequency of the cellular antenna.

In addition to one or more of the features described herein, every dimension of the cellular antenna is less than a quarter of the wavelength corresponding with the lowest operating frequency of the cellular antenna.

In addition to one or more of the features described herein, the cellular antenna structure also includes a metal carrier between the spoiler chassis and the ground plane.

In addition to one or more of the features described herein, the metal carrier is electrically connected to the spoiler chassis and is affixed to the spoiler chassis.

In addition to one or more of the features described herein, the metal carrier is electrically connected to the ground plane and is affixed to the ground plane.

In addition to one or more of the features described herein, the metal carrier includes an opening to connect a cable from the vehicle to the ground plane.

In addition to one or more of the features described herein, the structural support is plastic.

In another exemplary embodiment, a method of fabricating a cellular antenna structure for a vehicle includes fabricating a ground plane to follow a slope of a spoiler chassis. The spoiler chassis is a portion of the vehicle covered by a spoiler. The method also includes affixing a cellular antenna orthogonal to the ground plane and electrically connected to the ground plane and affixing a structural support to the ground plane to maintain a fixed position of the cellular antenna orthogonal to the ground plane.

In addition to one or more of the features described herein, the method also includes shaping the cellular antenna to fit completely within a volume defined by the spoiler.

In addition to one or more of the features described herein, the shaping includes shaping the cellular antenna as a plate with one or more bends.

In addition to one or more of the features described herein, the method also includes sizing the cellular antenna such that every dimension of the cellular antenna is less than a wavelength corresponding with a lowest operating frequency of the cellular antenna.

In addition to one or more of the features described herein, the sizing includes sizing every dimension of the cellular antenna to be less than a quarter of the wavelength corresponding with the lowest operating frequency of the cellular antenna.

In addition to one or more of the features described herein, the method also includes affixing a metal carrier to the ground plane, the metal carrier being configured to be disposed between the spoiler chassis and the ground plane.

In addition to one or more of the features described herein, the method also includes configuring the metal carrier to be electrically connected to the spoiler chassis and affixed to the spoiler chassis.

In addition to one or more of the features described herein, the method also includes configuring the metal carrier to be electrically connected to the ground plane.

In addition to one or more of the features described herein, the method also includes fabricating the metal carrier with an opening to connect a cable from the vehicle to the ground plane.

In addition to one or more of the features described herein, the method also includes fabricating the structural support from plastic.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
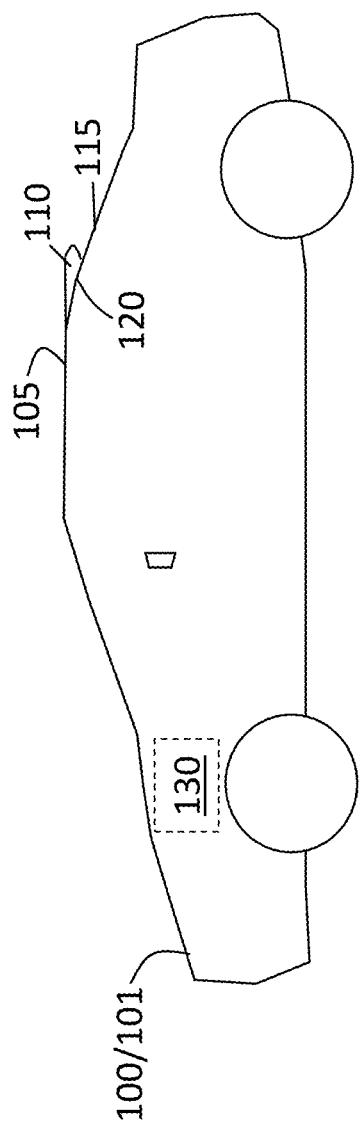
FIG. 1 is a block diagram of a vehicle that includes a cellular antenna structure for integration within the vehicle.

The following description is merely exemplary in nature and is not intended to limit the present disclosure, its application or uses. It should be understood that throughout the drawings, corresponding reference numerals indicate like or corresponding parts and features.

As previously noted, a vehicle may include one or more cellular antennas to facilitate communication between a cellular device in the vehicle and a cellular network. The cellular communication may be performed at sub-6 gigahertz (GHz) frequencies. For example, the communication may use a frequency range on the order of 617 megahertz (MHz) to 5 GHz. Prior cellular antennas designs include at least a portion of the antenna protruding from a surface of the vehicle. This may be undesirable from the standpoint of aesthetics and aerodynamic performance.

Embodiments of the systems and methods detailed herein relate to a cellular antenna structure for integration within a vehicle. According to exemplary embodiments, the entire cellular antenna is contained within a volume of a rear spoiler of a vehicle such that no portion of the antenna protrudes from the vehicle. The ground plane of the cellular antenna is parallel with and electrically connected to the chassis of the vehicle and the antenna is oriented to maximize its effective height and thereby its efficiency. The size and shape of the cellular antenna are designed to obtain a complete fit within the volume defined by the spoiler without sacrificing radiation efficiency.

In accordance with an exemplary embodiment, FIG. 1 is a block diagram of a vehicle 100 that includes a cellular antenna structure 200 (FIG. 2) for integration within the vehicle 100. The exemplary vehicle 100 shown in FIG. 1 is an automobile 101. In alternate embodiments, the vehicle 100 may be a pick-up truck, sport utility vehicle, or another type of vehicle. The vehicle 100 is shown with a spoiler 110 at the rear edge of the roof 105. The exemplary spoiler 110 is between the roof 105 and the rear windshield 115, as shown. In alternate embodiments, the cellular antenna structure 200 may be located within a volume defined by other fascia of the vehicle 100.

The vehicle 100 includes a spoiler chassis 120, which is a part of the vehicle frame that acts as a structural support for the spoiler 110 and is also the part of the vehicle that is covered by the spoiler 110. The spoiler chassis 120 is metal and is a sloped transition between the roof 105 and the rear windshield 115, as shown. As further discussed with reference to FIG. 2, this spoiler chassis 120 acts as an attachment point for the cellular antenna structure 200. The vehicle 100 may include additional components (e.g., sensors, displays) such as a controller 130 to facilitate the cellular communication from within the vehicle 100 using the cellular antenna structure 200. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
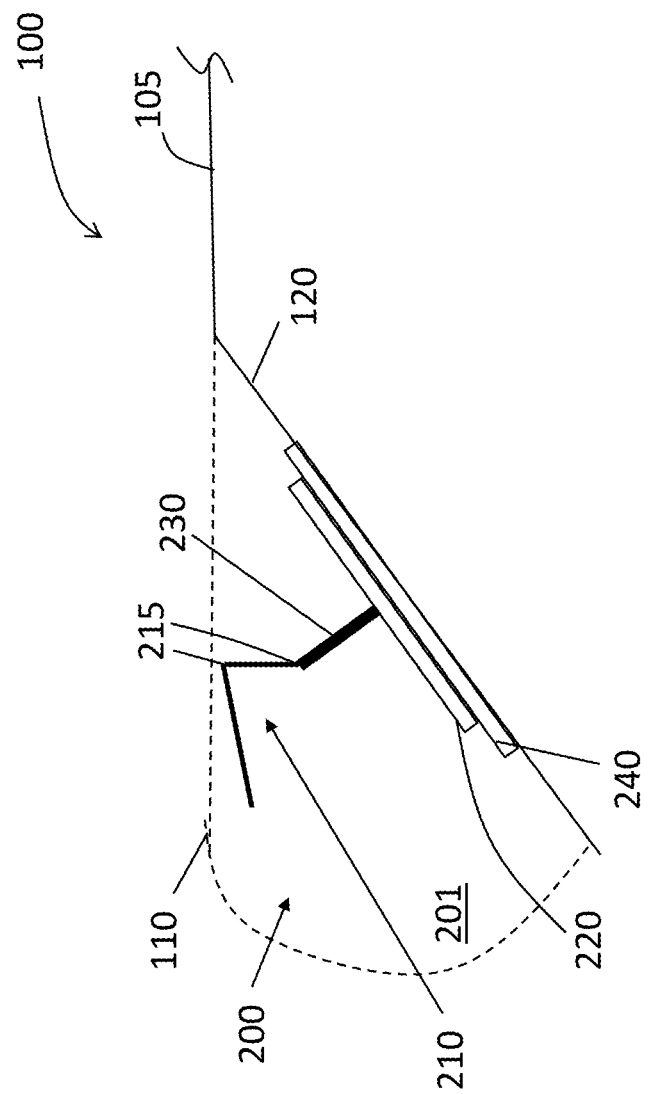
FIG. 2 details the cellular antenna structure that is integrated within the vehicle according to one or more embodiments.

FIG. 2 details the cellular antenna structure 200 that is integrated within the vehicle 100 according to one or more embodiments. Specifically, the cellular antenna structure 200 includes the cellular antenna 210, a ground plane 220 (e.g., printed circuit board) that is electrically conductive, a metal carrier 240 to which the ground plane 220 is electrically connected and affixed and which is electrically connected and affixed to the spoiler chassis 120, and a support structure 230 on the ground plane 220 that holds the cellular antenna 210 in a fixed position relative to the ground plane 220 and metal carrier 240. The spoiler 110 is indicated along with a portion of the roof 105. The volume 201 defined by the spoiler 110 is also indicated. While the spoiler chassis 120 is electrically conductive, the spoiler 110 itself has dielectric properties. As previously noted, the size, shape, and orientation of the cellular antenna 210 facilitates a complete fit within the spoiler 110 (i.e., with no portion of the antenna structure 200 protruding outside the spoiler 110). As also noted, the design of the cellular antenna structure 200 according to one or more embodiments controls radiation efficiency of the cellular antenna 210 based on the design features detailed.

One of the design features of the cellular antenna structure 200 is that the cellular antenna 210 is a monopole antenna that is electrically small. The term electrically small refers to the fact that the cellular antenna 210 is shorter than the wavelength of signals transmitted and received. Specifically, every dimension of the cellular antenna 210 is less than the wavelength corresponding to the lowest operating frequency of the cellular antenna 210. For example, every dimension of the cellular antenna 210 may be less than a quarter of the wavelength corresponding to the lowers operating frequency. While a monopole antenna is traditionally a straight rod, the cellular antenna 210 is a monopole antenna that is shaped to fit within the volume 201 of the spoiler 110. Thus, the size is based on the operating frequency and the corresponding wavelength (e.g., length of cellular antenna 210 is half the wavelength) and the shape is designed such that the cellular antenna 210 fits completely in the volume 201 within the spoiler 110. The shape may also be based on frequency response of the cellular antenna 210. That is, for example, modeling or simulation may be used to determine the frequency response resulting from a particular shape of the cellular antenna 210.

For the exemplary case shown in FIG. 2, the lowest operating frequency may be 617 MHz. In this case, the cellular antenna 210 may have a length that is less than a quarter of the wavelength that corresponds with 617 MHz. The cellular antenna 210 shape includes two bends 215 in the plate that makes up the monopole cellular antenna 210, one of which is occluded by the support structure 230. As previously noted, the number and location of bends 215 may be selected to ensure a fit within the volume 201 defined by the spoiler 110 and may additionally be based on the resulting frequency response.

In addition to size and shape, another design feature of the cellular antenna structure 200 relates to the orientation of the cellular antenna 210 relative to the ground plane 220. To be clear, the ground plane 220 is not horizontal but, instead, conforms to the slope of the spoiler chassis 120. The spoiler chassis 120 is angled (e.g., 45 degrees) down from the roof 105, which is shown as horizontal in the exemplary case. The roof 105 may have a curvature in alternate embodiments and in different vehicles 100. As shown, the cellular antenna 210 is orthogonal to the ground plane 220. The portion of the cellular antenna 210 that couples to the ground plane 220 (occluded by the support structure 230 in FIG. 2 but visible in FIG. 3) is perpendicular to the ground plane 220, which means that it is not vertical because, as noted, the ground plane 220 is not horizontal.

This relative orientation results in a maximum effective height for the cellular antenna 210. The effective height, also referred to as effective length, is the height of the center of radiation of the cellular antenna 210 above the ground plane 220 and effects the efficiency of the cellular antenna 210. Specifically, the effective height is the ratio of induced voltage to incident electric field. This ratio is maximized by the orientation of the cellular antenna 210 relative to the ground plane 220 shown in FIG. 2. If the cellular antenna 210 were vertical (i.e., the portion of the cellular antenna 210 that couples to the ground plane 220 were vertical), then the cellular antenna 210 would be closer to the spoiler chassis 120 and the roof 105, resulting in capacitance and decreased effective height and, consequently, decreased efficiency. Thus, in the arrangement of FIG. 2, the orientation that provides maximum effective height can be seen as the orientation that keeps the cellular antenna 210 farthest from the spoiler chassis 120.

Figure 3:
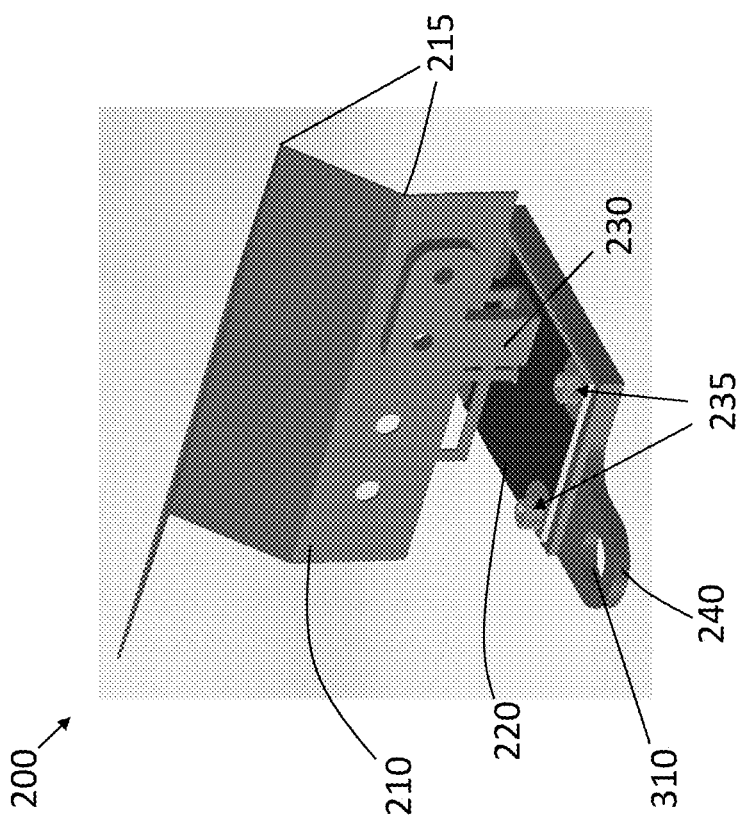
FIG. 3 is an isometric view of the cellular antenna structure that is integrated within the vehicle according to one or more embodiments.

FIG. 3 is an isometric view of the cellular antenna structure 200 that is integrated within the vehicle 100 according to one or more embodiments. The metal carrier 240 is shown affixed to the ground plane 220 of the cellular antenna 210 via screws 235. According to alternate embodiments, the metal carrier 240 and the ground plane 220 may be electrically connected and affixed with another type of fastener. The support structure 230 may be a plastic or other non-conductive part affixed to the ground plane 220 and arranged to support and fix the cellular antenna 210 with respect to the ground plane 220. As noted with reference to FIG. 2, the perpendicular arrangement between the ground plane 220 and the part of the cellular antenna 210 coupled to the ground plane 220 results in maximized effective height and, thus, efficiency of the cellular antenna orientation shown in FIG. 3. An attachment point 310 used to attach the metal carrier 240 to the spoiler chassis 120 is indicated. A screw may be inserted in the attachment point 310, for example.

Figure 4:
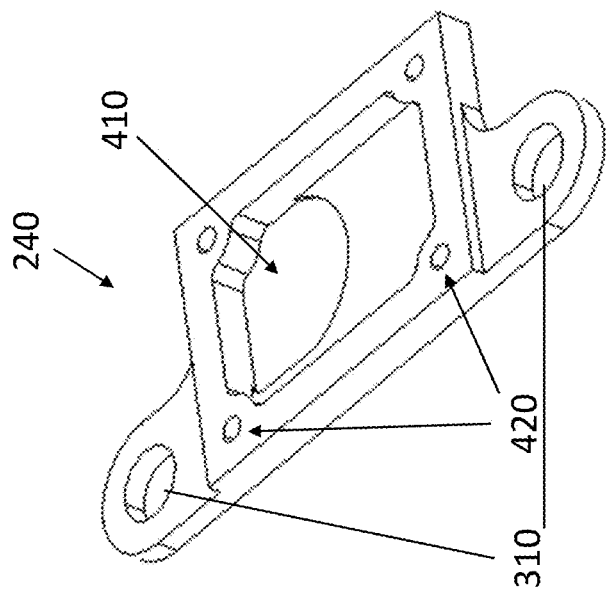
FIG. 4 shows the metal carrier of the cellular antenna structure that is integrated within the vehicle according to one or more embodiments.

FIG. 4 shows the metal carrier 240 of the cellular antenna structure 200 that is integrated within the vehicle 100 according to one or more embodiments. As previously noted, the metal carrier 240 is electrically connected to the spoiler chassis 120 on one side and to the ground plane 220 on the other. The metal carrier 240 may include an opening 410 for a cable to the ground plane 220, for example. Attachment points 420 to affix the metal carrier 240 to the ground plane 220 are indicated. Screws 235 may engage each of the attachment points 420, for example. Additional attachment points 310 that are used to affix the metal carrier 240 to the spoiler chassis 120 are also indicated.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A cellular antenna structure in a vehicle, the cellular antenna structure comprising:
   a ground plane configured to follow a slope of a spoiler chassis, the spoiler chassis being a portion of the vehicle covered by a spoiler;
   a cellular antenna orthogonal to the ground plane and electrically connected to the ground plane; and
   a structural support affixed to the ground plane and configured to maintain a fixed position of the cellular antenna orthogonal to the ground plane,
   wherein every dimension of the cellular antenna is less than a wavelength corresponding with a lowest operating frequency of the cellular antenna.

2. The cellular antenna structure according to claim 1, wherein the cellular antenna is shaped to fit completely within a volume defined by the spoiler.

3. The cellular antenna structure according to claim 2, wherein the cellular antenna is shaped as a plate with one or more bends.

4. The cellular antenna structure according to claim 1, wherein every dimension of the cellular antenna is less than a quarter of the wavelength corresponding with the lowest operating frequency of the cellular antenna.

5. The cellular antenna structure according to claim 1, further comprising a metal carrier between the spoiler chassis and the ground plane.

6. The cellular antenna structure according to claim 5, wherein the metal carrier is electrically connected to the spoiler chassis and is affixed to the spoiler chassis.

7. The cellular antenna structure according to claim 5, wherein the metal carrier is electrically connected to the ground plane and is affixed to the ground plane.

8. The cellular antenna structure according to claim 5, wherein the metal carrier includes an opening to connect a cable from the vehicle to the ground plane.

9. The cellular antenna structure according to claim 1, wherein the structural support is plastic.

10. A method of fabricating a cellular antenna structure for a vehicle, the method comprising:
    fabricating a ground plane configured to follow a slope of a spoiler chassis, the spoiler chassis being a portion of the vehicle covered by a spoiler;
    affixing a cellular antenna orthogonal to the ground plane and electrically connected to the ground plane; and
    affixing a structural support to the ground plane to maintain a fixed position of the cellular antenna orthogonal to the ground plane,
    wherein every dimension of the cellular antenna is less than a wavelength corresponding with a lowest operating frequency of the cellular antenna.

11. The method according to claim 10, further comprising shaping the cellular antenna to fit completely within a volume defined by the spoiler.

12. The method according to claim 11, wherein the shaping includes shaping the cellular antenna as a plate with one or more bends.

13. The method according to claim 10, wherein the sizing includes sizing every dimension of the cellular antenna to be less than a quarter of the wavelength corresponding with the lowest operating frequency of the cellular antenna.

14. The method according to claim 10, further comprising affixing a metal carrier to the ground plane, the metal carrier being configured to be disposed between the spoiler chassis and the ground plane.

15. The method according to claim 14, further comprising configuring the metal carrier to be electrically connected to the spoiler chassis and affixed to the spoiler chassis.

16. The method according to claim 14, further comprising configuring the metal carrier to be electrically connected to the ground plane.

17. The method according to claim 14, further comprising fabricating the metal carrier with an opening to connect a cable from the vehicle to the ground plane.

18. The method according to claim 10, further comprising fabricating the structural support from plastic.

* * * * *